United States Patent Office

3,039,876
Patented June 19, 1962

3,039,876
PROCESS FOR THE MANUFACTURE OF MALT BEVERAGES
Dwight L. Baker and Harry Stollberg, Milwaukee, Wis., assignors, by mesne assignments, to Union Carbide Corporation, New York, N.Y., a corporation of New York
No Drawing. Filed Dec. 21, 1959, Ser. No. 860,737
16 Claims. (Cl. 99—52)

This invention relates to the manufacture of stable malt beverages. More particularly it is directed to the preparation of beverages such as beer and ale by an improved process resulting in a product having enhanced foam stability and substantial freedom from cloudiness or turbidity over extended storage periods at low, high or alternating high and low temperatures. Specifically, the invention is concerned with the introduction of a novel oxidation step into the brewing process which results in a final packaged product (e.g., bottled or canned) having substantial freedom from the precipitation of colloidal materials and which is, therefore, characterized by a high degree of stability and clarity throughout any normal period of storage.

When beers leave the brewery they are normally at their peak of excellence but begin, in time, to deteriorate. A prime indication of such deterioration is the formation after a time of cloudiness or turbidity in the beer which is apparent when the same is poured into the glass. While the deterioration which is thus reflected does not normally affect the wholesomeness of the beer, it certainly detracts from its appearance and consumer acceptability.

The problem of producing a brilliantly clear beer (and unless otherwise indicated the discussion herein with respect to beer applies also to ale) is one which has plagued the brewing industry for many years. Thus, the consumer wants, and the breweries have made substantial efforts to produce, a product which when poured into the glass at the time of consumption is free from colloidal material which imparts turbidity or a cloudy appearance. Many different ways of solving the problems inherent in producing such a product have been suggested, and a number of these have been commercially adopted over the years. Probably the best known and most widely used technique is that of applying chill-proofing agents to the fermented product prior to bottling. These chill-proofing agents contain as active ingredients, proteolytic enzymes, such as ficin and papain. Not all proteolytic enzymes exhibit chill-proofing activity. The enzymes which do, however, are able to destroy, at least for a period, the tendency of certain colloidal materials in the beer to precipitate out of solution when the beer is cold. It has been found, however, that the beneficial effects of chill-proofing compounds are lost after substantial periods of storage. Thus, beer which has been chill-proofed with such enzymes in the usual manner will at first be free of turbidity but after extended storage periods under refrigeration or alternating cold storage, followed by warming and re-refrigeration, will often lose the desired immunity from turbidity. It has been found that once these enzymatic chill-proofing agents lose their effectiveness, the introduction of additional quantities thereof is not effective to again inhibit the undesired precipitation. But this is essentially academic in any event since those inhibitors normally "wear out" or become ineffective at a time when the beer is sealed in bottles or cans and there is nothing anyone can do to prevent the dissatisfaction of the consumer.

Other methods of increasing the stability of beer which do not depend upon the activity of proteolytic enzymes have also been practiced. Such methods, for the most part, are based either upon the use of a precipitating agent or adsorptive materials. While the proteolytic enzyme chill-proofing process is quite specific in its activity, the behaviour of other materials, such as tannic acid or adsorptive clays, when added to brews are not. And the color, flavor, foam stability and certain other properties of the beer are subject to change when these materials are employed.

This invention is, in part, based on the theory that if the precipitable material which might ultimately come out of solution after packaging and storage could be removed prior to bottling, then cloudiness or turbidity caused by post-packing precipitation would be prevented. The addition of chill-proofing enzymes is apparently effective because it prevents, at least for a time, the ability of the precipitable material to come out of solution and to cause cloudiness. In other words, such enzymes function to keep the cloud formers in solution. The difficulty up until now, however, has been that while a great quantity of the precipitable material can be rendered for a time unprecipitable, it has been difficult to add a material to the beer which affected only the precipitable material and did not have some disadvantageous effect upon color, flavor or foam stability. Enzyme chill-proofing reactions are quite specific as noted before, and for that reason have been generally acknowledged to be the superior technique for handling this cloud prevention. A great disadvantage with these, however, is that their benefits are not permanent. The reason for the precipitation of such materials is not entirely understood, but it seems reasonable to conclude that at least in part the problem results from the oxidation of certain substances dissolved in the beer by entrained and entrapped air in the packaged product.

In any effort to precipitate the ultimate cloud-formers prior to bottling it is essential that this be selectively performed. Precipitating or otherwise disadvantageously affecting flavor or color components of the beverage must be avoided.

One of the inventors of the instant application has previously directed his attention to this general problem and in U.S. Patent No. 2,482,724 (reissued as Reissue Patent No. 23,523) it was proposed that there be added to the final beer, just before bottling, an oxidase type of enzyme so as to catalyze the consumption of the entrapped oxygen in the oxidation of a small amount of an oxidizable substance present in the beer. For example, in packaged beer the oxygen in the entrapped air can be used up in a harmless way by combining with a slight amount of the sugars present to produce an innocuous component which remains in the beer. Neither the original component nor the oxidized derivative effect the stability or flavor of the beverage, since the entrapped oxygen is thus used up in a manner which prevents its deteriorative effect on the precipitable material in solution, formation of a precipitate is prevented. In Reissue Patent No. 23,523 the enzyme agent was added at the conclusion of the brewing process and considerable success was attained by the method. Likewise, as noted before, the enzymatic substances employed in the usual chill-proofing operation are also added at the conclusion of the brewing process, just prior to bottling.

The instant invention involves the introduction of an intentional oxidation step in the brewing process so as to effect selective removal of the precipitable materials prior to the time that the final product is bottled. Contrary to the previous methods, the instant invention is directed to the utilization of a peroxidase catalyzed oxidation by hydrogen peroxide of the potentially precipitable materials, at any one of several stages in the brewing process, and preferably prior to the fermentation step. The herein described method of precipitating and thereafter removing (by filtration, centrifugation, etc.)

the precipitable, turbidity-forming materials can also be conducted on the beer at the conclusion of the brewing process and prior to bottling. It is, of course, well known that peroxidase is a catalyst for the oxidation by hydrogen peroxide of various organic substances. The invention herein lies in the application of this oxidative process during the process of producing a beer, an ale or other malt beverage and results in a more stable beverage resistant to colloidal instability and freedom from the presence of precipitated matter in the packaged product.

It is important to note that although peroxidase may, to a certain extent, be present in ficin, one of the proteolytic enzymes employed in chill-proofing, peroxidase as such is not an enzyme which effects chill-proofing. Thus, although ficin, as will be explained later, may be employed for its peroxidase content in accordance with the present invention, peroxidase may not be substituted for ficin in a normal chill-proofing step. This may aid understanding of the present invention and particularly in recognizing the distinction between this invention and the prior use of chill-proofing enzymes in the stabilization of beer.

Certain materials familiar to the brewing industry contain peroxidase. Thus, malt and malt rootlets contain peroxidase as a natural enzymatic property. Indeed, as will be explained hereinafter, it is contemplated that the peroxidase employed as a catalyst in accordance with the present invention may be derived from the malt itself, from the addition of a solution prepared from malt rootlets or from any other suitable source. A known source which is especially suitable is horse-radish.

Because of the fact that malt itself contains a substantial quantity of peroxidase, it is possible to carry out the instant invention by adding $H_2O_2$ to the wort before it is boiled. The peroxidase is, of course, destroyed in the boiling of the wort.

In the brewing process usually employed in the American brewing industry, the first step is to prepare two mashes of grain, one of malt and the other ordinarily of corn or rice. The malt mash is held for a period at about 100° F. while the corn or rice mash, usually containing in addition some small amount of malt (for example, from about 10 to 20% of the adjuncts), is then heated from 100° F. to boiling.

After the corn or rice starch has boiled from 5 to 60 minutes it is normally added to the malt mash with constant agitation. And after the mashes are mixed that temperature should be at about 159° F., at which temperature starch is rapidly hydrolyzed by the enzymes contributed by the malt. After 15 to 30 minutes the combined mash is heated to about 169° F. and the heated mash is then run into a lauter tub for what is normally considered the second stage in the brewing process. In the lauter tub the solution is separated from the undissolved debris and all of the solubles are washed out of the grain bed with hot water. The resulting solution, called the wort, is then boiled with hops and evaporated to a desired concentration (normally about a specific gravity of 1.048) after which it is cooled to about 50° F. and then pitched with yeast. After about a week in the fermentation cellar most of the sugars in the wort are converted to alcohol. The liquid at this stage is called Ruh beer and is cooled to about 30° F. and after most of the yeast has settled, run into a Ruh cellar. There it ages for about two weeks. Following aging, the process normally involves filtration and carbonation. An additional aging period of two to three weeks' duration and further carbonation then follow and chill-proofing agents are added, a final filtration or two and bottling and pasteurization completes the process.

The improvement afforded by the present invention is adapted for use at any desired stage in the brewing process. Thus, the $H_2O_2$ (or a suitable compound which will afford $H_2O_2$ in solution) may be added to the malt mash, to the complete mash prior to lautering or to the wort prior to boiling, and the peroxidase content of the malt may be relied on to catalyze the desired oxidation, i.e., additional peroxidase is not necessary. On the other hand, after boiling of the wort the addition of the peroxide must be accompanied by the addition of peroxidase.

In general, the desired peroxidase catalyzed reaction has been carried out at temperatures of from about 0° C. to about 75° C. In addition to malt-derived peroxidase, that enzyme may be obtained from such sources as horse-radish, ficin, malt rootlets, etc.

When treating finished products such as beer, the amount of hydrogen peroxide which is employed in accordance with the present invention may vary over a relatively narrow range and is rather limited in quantity, if oxidized taste is to be avoided. When $H_2O_2$ is added at an earlier stage, such as prior to the boiling of the wort or, indeed, at any time prior to fermentation, however, larger quantities can be employed without danger of over oxidation.

A definition of the exact amount of $H_2O_2$ addition is not readily forthcoming. The reason is that the off flavor or other change in properties which can occur if too great an amount of $H_2O_2$ is employed is an empirical thing and different people may conclude that the limit is reached before others would recognize a significant change. Likewise, from the standpoint of the lower limit of $H_2O_2$ addition, it is not possible to state with precision the least effective amount because, after all, the goal is simply one of oxidizing most or all of the precipitable material and nothing else. It will be recognized, therefore, that the range is significant only in that it is intended to show how improved stability may be obtained. In the case of the finished beer maximum stability is obtained only at the risk of causing oxidized taste. Substantial improvement, however, can be obtained without change in taste when treating at any of the various stages, including the wort or the beer.

In general, if the $H_2O_2$ is added prior to fermentation, including addition to the boiled wort, an amount of $H_2O_2$ from about 10 to about 100 parts per million (p.p.m.) based on the total volume of the wort may be added. As much as 200 p.p.m. of $H_2O_2$ has, however, been added without detectable ill effects. When carrying out the present invention on the final beer, or, indeed, on the Ruh beer, a somewhat lesser amount of $H_2O_2$ is in order and for that reason from about 1 to 10 p.p.m. of $H_2O_2$ is recommended at such stage.

The amount of peroxidase employed is also somewhat different, depending upon whether wort or beer is being treated in accordance herewith. For treatment of boiled wort, an amount of from about 0.1 to about 20 p.p.m. of peroxidase (horse-radish peroxidase or equivalent) is preferred, while for beer the amount is preferably reduced to from about 0.05 to about 0.5 p.p.m.

The classical source material for the preparation of purified peroxidase is horse-radish. Several laboratory supply houses offer it in highly purified form. Another good source, as noted before, is ficin—an enzyme derived from the latex of the fig tree. Malt and malt rootlets (sprouts) are also excellent sources of peroxidase. Since peroxidase derived from horse-radish is the normally accepted pure form of the material, it is not surprising that its potency is greater than that of ficin, malt, rootlets, etc. In general, it has been found that 1 p.p.m. of horse-radish peroxidase is equivalent to about 20 p.p.m. of ficin in catalyzing the peroxide oxidation of filtered wort. Other peroxidase preparations vary in strength but their relative potency with respect to ficin can be readily determined and utilized.

A series of beers have been prepared in the pilot brewery described by the present inventors and another in the Proceedings of the American Society of Brewing Chemists in 1957. The oxidation treatment of the present invention has been carried out a various stages and in differing degrees on that series of beers. The results of those brews are set forth in the following illustrative examples. It should be understood that there is no intention that the invention be limited by these examples but only that those skilled in the art shall thereby be given additional information and be more specifically advised of the details of actual brewing operations involving the novel improvements hereof. The invention is limited only by the spirit of the disclosure and the scope of the appended claims.

EXAMPLE I

Three identical boiled worts from 70% malt and 30% corn, calculated on an extract basis, were prepared in accordance with normal American brewing practice, as described above, for purposes of comparison. These were designated worts A, B and C. Wort C was employed as the standard or control, and was pitched immediately with yeast after being cooled to 52° F. and then set aside for fermentation. Worts A and B, on the other hand, were cooled to 52° F. and there was admixed with each 1 p.p.m. of purified horse-radish peroxidase (Nutritional Biochemical Co.) and 100 p.p.m. of $H_2O_2$ (Merck Superoxol). Then these latter two worts—after standing over night in the fermentation cellar at 52° F. were pitched with yeast and finished in the same manner as wort C. At the conclusion of the fermentation, potassium metabisulfite (KMS) and ascorbic acid were added to the brew from wort B at the rate of ½ lb. and ¾ lb. per 100 barrels, respectively. All three brews, at the end of cold storage, were treated with commercial chill-proofing compound (2 lb./100 bbls.), filtered, bottled and pasturized.

The analyses of these three worts and the resulting beers are as follows:

Table I

|  | A | B | C |
|---|---|---|---|
| Wort Analysis: |  |  |  |
| Original Extract, percent | 12.12 | 12.02 | 12.09 |
| Color, Lovibond | 3.68 | 3.55 | 3.64 |
| pH | 5.2 | 5.1 | 5.1 |
| Acidity, percent (As Lactic Acid) | 12.40 | 12.94 | 13.55 |
| Nitrogen, percent | 0.076 | 0.076 | 0.074 |
| Rapid Attenuation of Wort, ° Plato | 3.02 | 3.08 | 3.13 |
| Beer Analysis: |  |  |  |
| Apparent Extract, percent | 3.07 | 3.09 | 3.19 |
| Color, Lovibond | 3.20 | 2.98 | 2.96 |
| pH | 4.25 | 4.2 | 4.3 |
| Acidity, percent (As Lactic Acid) | 17.99 | 19.88 | 18.53 |
| Nitrogen, percent | 0.055 | 0.059 | 0.057 |
| Original Extract, percent (Calculated) | 11.83 | 11.90 | 11.95 |
| Real Extract, percent | 4.74 | 4.81 | 4.86 |
| Alcohol by Weight, percent | 3.05 | 3.65 | 3.65 |
| Real Degree of Fermentation, percent | 59.93 | 59.57 | 59.33 |
| Apparent Degree of Fermentation, percent | 74.04 | 74.03 | 73.30 |
| Ml. Air | 1.30 | 1.45 | 1.50 |
|  | 1.80 | 1.45 | 1.70 |
| Foam Index | 1.15 | 2.95 | 2.90 |
|  | .23 | .22 | .36 |
|  | .26 | .27 |  |

It will be noted from the above that there exists very little difference in the analyses of these three brews. The color of the control and beer B are almost identical whereas beer A, which had received the oxidative treatment but no reducing agents, was 3.20L., i.e., a little darker in color. The foam stability of both peroxide-peroxidase treated beers was much better than the control and equal to the best of commercial beers. Indeed, whereas some commercial brewers employ foam stabilizers none was employed in any of these experimental beers. Samples of beers A, B and C were next stored at 72° F. and 30° F. At regular intervals, bottles of beer stored at 72° F. were chilled for three days at 30° F. and the turbidity compared with turbidity standards (hereinafter discussed). Samples of the beers stored at 30° F. were also regularly examined for turbidity development.

In measuring the colloidal stability of beers it is usual to select arbitrarily a turbidity at which the beer is believed to be broken down. For that purpose 100 Formazin Turbidity Units (FTU) is normally employed by the instant applicants and was used in these experiments. This degree of turbidity is judged by most people to be "slightly hazy." For a more detailed discussion of this method of turbidity determination see the 1957 Proceedings of the American Society of Brewer Chemists at p. 165. There, 1 FTU is defined as being equal to the light reflected by the insoluble reaction products of 0.00000725 gm. of hydrozine sulfate plus 0.00000725 gm. of hexa-methylenetetramine diluted to 100 cc. Stability is determined herein in terms of the number of days it takes under specific storage conditions for beer to develop a turbidity of 100 FTU upon being held at 30° F. for three days. The stability of beers A, B and C was as follows:

Table II

COMPARATIVE COLLOIDAL STABILITY

| Beer | Stored at 72° F. | Stored at 30° F. |
|---|---|---|
| A | 100 FTU at 234 days | 40 FTU at 400 days. |
| B | 100 FTU at 270 days | 40 FTU at 400 days. |
| C | 100 FTU at 80 days | 100 FTU at 90 days. |
| Commercial Beers | 100 FTU at 90–150 days | 100 FTU at 40–100 days |

EXAMPLE II

Another two worts (designated worts D and E) similar to those described in Example I were prepared, boiled and cooled to 52° F. To wort D was added 60 p.p.m. of $H_2O_2$ and 10 p.p.m. of horse-radish peroxidase. To wort E was added 20 p.p.m. of peroxidase and 60 p.p.m. of of $H_2O_2$. After standing overnight at 52° F. the worts were pitched and the beers were then finished in the normal manner, including the addition of chill-proofing enzymes, as in Example I. When bottled and pasteurized, samples of it were stored under three sets of conditions, viz., (a) at 72° F., (b) at 30° F., and (c) at 100° F. The development of "chill-haze" was observed as these beers aged. After 390 days of storage, samples of both beers (i.e., beers D and E) which had been stored at 30° F. and 72° F., respectively, after chilling for three days at 30° F. (the 72° F. stored samples were returned to room temperature between each chilling test) had a turbidity well below 100 FTU., indicating a high degree of stability for the same. The samples stored at 100° F. broke down, i.e., had readings in the turbidity test greater than 100 FTU., after 226 days for beer D and 210 days for beer E, respectively. Both of these beers exhibited superior foam stability. For sake of comparison, the longest any commercial beer has stood up at 100° F., is 87 days and an average of many tests on commercial beers is about 65 days.

In Example II it will be noted that the quantity of peroxidase was greatly increased over that employed in Example I. There was no detectable disadvantage. Further experiments to determine whether increase in the quantity of $H_2O_2$ was detrimental showed that on finished beer, but not on any wort tested, the use of 100 p.p.m. of $H_2O_2$ and 1 p.p.m. of horse-radish peroxidase resulted in a darker beer having objectionable taste. The taste was characteristic of an old, oxidized beer.

Additional tests on beers prepared in the pilot brewery as well as from the Ruh cellar of a commercial brewery were treated with 0.1 p.p.m. of horse-radish peroxidase and only 5 p.p.m. of $H_2O_2$. After storing for two weeks, these beers were filtered, chill-proofed and pasteurized in the bottles. Samples treated with peroxidase and $H_2O_2$ were stored with samples of the same brews which did not receive such treatment and the treated samples were found to have much greater shelf life. Thus, when stored at 72° F. the treated beers were stable (as determined by turbidity tests) for at least 2.7 times as long as the controls; those stored at 30° F. were twice as stable in terms of length of time to reach turbidity greater than 100 FTU; and the samples stored at 100° F. were found to be stable for 4.7 times as long a period. The treated beers had significantly greater foam stability than the controls and taste panels judged the same free of oxidized taste.

Tests have been made to assay the concentration of peroxidase (in terms of comparative potency to purified horse-radish peroxidase) in unboiled wort, ficin and adjuncts prepared from malt rootlets. As noted above, ficin, which has a substantial proteolytic enzyme factor for which that material is normally employed as a chill-proofing agent, is about one-twentieth as potent in peroxidase as horse-radish peroxidase. A typical wort which had been subjected to a conversion temperature of 158° F. for 30 minutes, heated to 169° F. and held there for about three hours, i.e., during the lautering process, when cooled was found to contain an amount of peroxidase equivalent to 75 p.p.m. of horse-radish-peroxidase. Obviously, therefore, the addition of further peroxidase to unboiled wort is unnecessary. Because the peroxidase content of unboiled wort is so substantial, the same may itself be used as the peroxidase source of another or even several other brews, where it is added to boiled wort in accordance herewith. While the peroxidase content of unboiled wort is generally in excess of what may be needed for treatment in accordance herewith to effect stabilization no disadvantageous effects from carrying out the oxidation in the presence thereof have been detected.

A peroxidase adjunct was prepared from malt sprouts (rootlets) by heating the same, preferably finely ground, in a small amount of water at 140° F. for 30 minutes. This adjunct (prepared from an amount of rootlets equivalent to 7550 p.p.m. of the boiled wort to which the same was added) was equivalent to purified horse-radish-peroxidase in the amount of 10 p.p.m. Rather than use the rootlets per se a soluble peroxidase preparation may be made by extracting with water at 140° F. for 30 minutes, separating the insolubles and fractionating the solubles by precipitation with $(NH_4)_2SO_4$. Such a preparation has approximately 54 times the peroxidase activity of the original rootlets on a weight for weight bases.

EXAMPLE III

A wort was prepared as in Example I but was boiled in the absence of hops addition and after the wort had cooled to 52° F., 1 p.p.m. of horse-radish-peroxidase and 50 p.p.m. of $H_2O_2$ were added. After standing for fifteen hours at such temperature the wort was pitched with yeast and finished as usual to yield bottled samples. The foam stability of this beer was found to be superior to beer made with hops but without the peroxide-peroxidase treatment. The collodial stability of the treated beer was outstanding.

The foregoing Example III is included to demonstrate the surprising ability of the described treatment to yield a beer of good foam stability in the absence of hops. Whereas hops have been added for the flavor they impart, they have also been considered essential for foam stability. Thus, a beer which has no added foam stabilizer and was not produced with hops has such poor foam stability that the usual test for foam stability becomes meaningless. But that same beer if treated in accordance herewith, either before or after boiling of the wort or in the final finishing, will yield a beer with highly stable foam. Since the amount of hops being used today is much less than prior to prohibition or even in Europe today and, indeed, the trend is toward milder and blander beer, this method of producing beer without hops will be of great interest to the brewer.

As noted previously, the peroxide which is most practical is hydrogen peroxide itself. But it should be understood that either organic or inorganic peroxides capable of affording $H_2O_2$ in solution and which do not otherwise disadvantageously affect the product may be employed. As examples of such peroxides may be mentioned those of calcium, phosphorus, urea and the like. Others will be suggested to those skilled in the art of chemistry. The present invention lies not in the manner in which an effective amount of hydrogen peroxide may be provided but rather in providing the art with the knowledge of the discovery that the application of the peroxidase catalyzed oxidation described will afford the user the important benefits herein defined.

For some reason the use of enzymatic chill-proofing such as employed commercially today is desirable in conjunction with the novel process herein described. Thus, the use of the two treatments results in a beer of far greater stability than with either treatment alone. Indeed, the increase in stability when employing both enzymatic chill-proofing and the process of the present invention has been found to be synergistic in nature.

We claim:

1. In the process of brewing malt beverages, the improvement which comprises (1) effecting a peroxidase catalyzed oxidation of precipitable constituents in the brew at any stage after the malt mash has been combined with other ingredients of the brew, and (2) removing the precipitate resulting from such oxidation prior to packaging.

2. In the process of brewing malt beverages, the improvement which comprises treating the malt mash with hydrogen peroxide in the presence of peroxidase and thereafter removing precipitated by-products of such treatment from the brew prior to packaging.

3. The process of brewing malt beverages which includes the step of effecting a peroxidase catalyzed hydrogen peroxide oxidation in the brew at any stage after the malt mash has been combined with other ingredients of the brew and removing precipitated products of the oxidation prior to packaging.

4. The improvement in the process of brewing malt beverages which comprises adding a small amount of hydrogen peroxide to the malt mash.

5. The process of claim 3 wherein hydrogen peroxide is added to the combined mash.

6. In the brewing of beer and ale wherein a mash comprising malt is processed through a lautering tub to produce a clear solution called wort, the improvement which comprises adding not more than about 100 parts per million of hydrogen peroxide to the wort prior to boiling the same and then carrying out the remainder of the brewing process including at least one step of removing suspended solids from the aqueous brew.

7. The process of claim 6 wherein the suspended solids are removed by filtration.

8. The process of claim 6 wherein the suspended solids are removed by centrifugation.

9. The improved process of claim 1 wherein the peroxidase catalyzed oxidation is carried out subsequent to boiling of the wort in the presence of minute added quantities of $H_2O_2$ and peroxidase.

10. The improved process of claim 1 wherein the peroxidase catalyzed oxidation is carried out in the boiled wort in the presence of a peroxidase content equivalent to at least about 1 part per million, based on the total wort, of purified horse-radish-peroxidase and from about 20 to about 100 parts per million of $H_2O_2$.

11. The improved process of claim 1 wherein the peroxidase catalyzed oxidation is carried out on the fermented brew in the presence of a peroxidase content equivalent to from about 0.05 to about 0.5 part per million, based on the total brew, of purified horse-radish-peroxidase and from about 1 to about 10 parts per million of $H_2O_2$.

12. The improved process of claim 1 which includes steps of adding enzymatic chill-proofing agent to the brew prior to packaging.

13. The improved process of claim 1 wherein the peroxidase is afforded by adding horse-radish-peroxidase.

14. The improved process of claim 1 wherein the peroxidase is afforded by the malt employed in the brewing process.

15. The improved process of claim 1 wherein the peroxidase is derived from the rootlets of malted barley.

16. The improved method of claim 1 wherein the peroxidase is afforded by the addition of ficin.

References Cited in the file of this patent

UNITED STATES PATENTS

| | | |
|---|---|---|
| 995,825 | Wallerstein | June 20, 1911 |
| 2,223,520 | Ioannu | Dec. 3, 1940 |
| 2,414,669 | Reich | Jan. 21, 1947 |

OTHER REFERENCES

"Oxidizing Enzymes in Brewing Materials II. Peroxidase in Malt and Barley," Wallerstein, Hale and Alba, Wallerstein Communications, December 1947, vol. X, No. 31, pp. 17–25.

"Chemistry and Technology of Enzymes," Tabuer, H., 1949, published by John Wiley & Sons, Inc., New York, page 330.